United States Patent

Jackson et al.

[15] 3,690,161
[45] Sept. 12, 1972

[54] METHOD AND APPARATUS FOR TESTING THIN WEBS IN SHEAR

[72] Inventors: Wendell T. Jackson; Martin M. Balaban, both of Dublin, Calif.

[73] Assignee: Hexcel Corporation, Dublin, Calif.

[22] Filed: Dec. 30, 1970

[21] Appl. No.: 102,734

[52] U.S. Cl. ................................... 73/101, 73/103
[51] Int. Cl. ............................................ G01n 3/24
[58] Field of Search ....... 73/101, 103, 96, 150 R, 159

[56] References Cited

UNITED STATES PATENTS

| | | | |
|---|---|---|---|
| 3,559,473 | 2/1971 | Dudderar et al. | 73/103 |
| 2,368,900 | 2/1945 | Templin | 73/103 X |
| 3,174,333 | 3/1965 | Behre | 73/101 |

*Primary Examiner*—Jerry W. Myracle
*Attorney*—Townsend & Townsend

[57] ABSTRACT

A method and apparatus for subjecting thin sheets, webs, foils, films and the like to in-plane shear stresses. A rectangularly shaped specimen is grasped at its long sides, opposing forces acting in the direction of the long sides are applied to the long sides and portions the sheet between the long sides are placed between stabilizing bars that maintain the web in its planar shape and prevent buckling of the web under the forces before its ultimate shear strength is reached.

16 Claims, 4 Drawing Figures

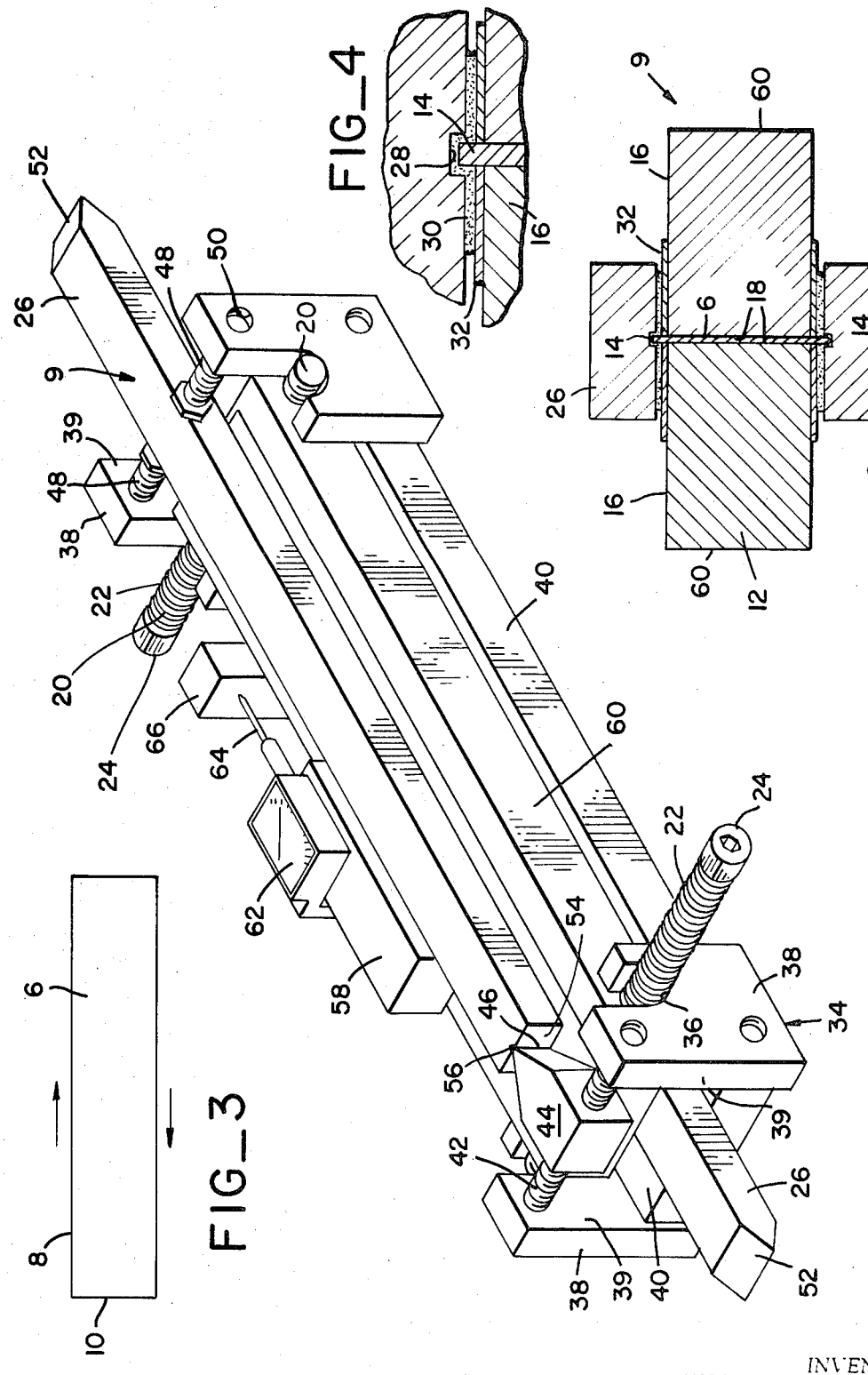

METHOD AND APPARATUS FOR TESTING THIN WEBS IN SHEAR

BACKGROUND OF THE INVENTION

Shear and compressive data on thin webs or sheets such as foils, films, fabrics and papers are not readily available due to a lack of adequate means for measuring these properties. When such webs are subjected to in-plane shear or compression with conventional test fixtures suitable and constructed for use with relatively thick webs, they buckle at stresses which are often no more than a minute fraction of the yield strength of the material and do not even remotely approach the ultimate strength of the material. Consequently, no meaningful determination of the shear strength, or the shear modulus computed therefrom, can be made. However, such data is of great value in selecting and testing thin web materials for various applications, such as for structural honeycomb, in which they are subjected to and must support substantial loads.

In the past, attempts have been made to test thin webs by laminating several webs together to counter the buckling of the specimens under relatively low stress. For meaningful results, this approach requires that the true shear strength of the laminate is the same as that of a single ply. This in turn requires that the interlaminer adhesive has a negligible thickness and negligible in-plane shear strength compared with any one ply. At the same time the interlaminer adhesive must provide perfect adhesion with no relative movement between the plies when the specimen is tested to failure. Furthermore, the combination of laminating pressure and temperature must not alter the mechanical properties of any one ply. It is difficult to meet the above criteria for thin webs. Frequently, and particularly for unknown materials, it is difficult to determine if the conditions are satisfied at all. It has been found that the test values for certain multiple ply laminates show no correlation with predictions for in-plane shear for a given material.

It is also known to determine the shear modulus by indirect methods for homogenous isotropic materials since the shear modulus is related to the tensile and compressive moduli of such materials. This approach, although it has been relatively widely accepted and practiced in the past, does not always yield accurate results and requires relatively complicated and time consuming calculations.

SUMMARY OF THE INVENTION

The present invention provides a method and apparatus for placing thin sheet, foil, web, film and the like specimens in a state of virtually pure shear and measuring the applied forces and deformation of the web under such forces. The method comprises the steps of providing a rectangular specimen having long sides of a length substantially greater than the length of short sides (at least 10:1) of the specimen and subjecting the long sides of the specimen to opposing forces acting in the direction of the long sides. A portion of the specimen between the long sides of the specimen to opposing forces acting in the direction of the long sides. A portion of the specimen between the long sides is stabilized, that is, is placed between flat, substantially rigid faces permitting relative movement between the web and the faces but preventing the buckling of the web under the forces before the web is subjected to its ultimate shear strength.

The apparatus or test fixture of the present invention comprises a pair of elongate force applying bars, each bar having a longitudinal notch therein into which the long specimen edges extend. Means such as a sheet adhesive or the like firmly secure the edges to the stress bars. A pair of stabilizing bars having smooth, flat opposing faces are pressed with a predetermined force against each side of the web between the stress bars and maintain the web in its flat shape even when subjected to substantial forces from the stress bar. The faces of the stabilizing bars are preferably provided with a low friction coating such as Teflon to assure relative movability between the specimen and the faces during testing to prevent frictional forces between the sheet and the stabilizing bar faces from influencing the test results.

The test fixture is placed into a press, the edgewise load applied to the force bars is registered and the relative deflection of the force bars as a result of deformation of the web and the fixture is measured. From these data and the known specimen dimensions the shear strength and shear modulus of the specimen can be determined.

The invention also provides a jig aiding the assemblage of the test fixture to save time and reduce the costs of operating it. Furthermore, the assembly of the jig in the fixture assures uniform and consistent relative positioning of the various parts of the test fixture to assure correct and repeatable test results.

Thus, the present invention provides a method and apparatus for testing thin sheets and the like in an efficient and precise manner. The resort to inaccurate and/or fail prone approximation for the determination of the shear strength and modulus of thin sheets has thus been eliminated. Such data now makes it possible to determine the shear strength and modulus of any desired material in an accurate manner from the actual sheet so that unknown or unexpected variations in such data due to the sheet thinness, for example, can be detected.

BRIEF DESCRIPTION OF THE DRAWINGS

FIG. 1 is a perspective front elevational view of the test fixture of the present invention placed into a positioning assembly jig of the present invention;

FIG. 2 is a cross sectional side elevational view of the test fixture only and illustrates the positioning of a thin sheet test specimen;

FIG. 3 is a plan view of a rectangular specimen used in conjunction with the test fixture of the present invention; and FIG. 4 is an enlarged fragmentary side elevational view of a portion of the test fixture and specimen illustrated in FIG. 2.

DESCRIPTION OF THE PREFERRED EMBODIMENTS

Referring to the drawings, a thin web specimen 6 for determining the shear strength and shear modulus of the material of the specimen has a rectangular shape with long sides 8 of a length substantially greater (at least 10:1) than the length of short sides 10 of the specimen. A suitable actual configuration of the specimen is a rectangular strip having a length of about six inches and a width of about one-half inch cut from the thin sheet or foil of the material to be tested.

The web is initially placed between a pair of opposing stabilizer bars 12 that have a width slightly less than the width of the specimen so that narrow portions of between about 0,015 to about 0,025 inch of the specimen protrude past sides 16 of the stabilizer bars. Flat faces 18 having a smooth, ground finish engage the specimen and maintain it in its flat shape. The ends of the stabilizer bars include suitable threaded bores and apertures through which shoulder screws 20 extend. Compression springs 22 are disposed between heads 24 of the shoulder screws and the respective stabilizing bars and bias the bars into engagement with specimen 6. The biasing force can be adjusted by loosening or tightening shoulder screws 20.

For accurate test results it is necessary that the specimen is relatively movable with respect to stabilizer bar faces 12 with a minimum of frictional forces. To enhance such movement the faces are preferably coated with a low friction material such as colloidal graphite, Teflon or the like.

After the specimen has been clamped between stabilizer bars 12 protruding specimen portions 14 are adhesively bonded to force applying bars 26 that have longitudinal grooves 28 that are placed over the protruding specimen portions. The force applying bars are constructed of tool steel to provide them with the required stiffness and rigidity. An adhesive, preferably a sheet or strip adhesive 30 is placed between the protruding specimen portions and the longitudinal grooves 28 and bars 26 are forced towards stabilizer bars 12 to thereby push the protruding specimen portions and the longitudinal grooves 28 and bars 26 are forced towards stabilizer bars 12 to thereby push the protruding specimen portions and the adhesive disposed about such portions into the grooves and, upon curing of the adhesive, firmly bond the protruding portions to the elongate force applying bars.

To prevent part of strip adhesive 30 from adhering to sides 16 of the stabilizer bars after curing, thin foil strips 32 such as aluminum strips are placed on each side of protruding specimen portions 14 before the elongate force applying bars 26 and/or the strip adhesive 30 are placed over the protruding specimen portions. In this manner adhesive material 30 extending outwardly from longitudinal groove 28 is prevented from adhering to stabilizer bar sides 16. Such adherence can influence the test and result in inaccurate or useless test data. Foil strips 32 can be replaced by other materials such as evaporating lubricants or the like.

To facilitate the assemblage of test fixture 9 an assembly jig 34 is provided. After the specimen has been clamped between stabilizer bars 12 and shoulder screws 20 have been suitably tightened the bars are placed in the assembly jig by positioning the head and shaft, respectively, of shoulder screws 20 in notches 36 of laterally spaced, opposing pairs of upright support blocks 38. Inner faces 39 of the support blocks are interconnected by an elongate base 40.

One pair of support blocks also mounts a rotatable threaded bar 42 which threadably engages a pointed locator 44 that terminates in a sharp edge 46. Rotation of threaded bar 42 in one or the other direction moves sharp edge 46 lateral to the stabilizer bars.

The other pair of support blocks 38 mount threaded shoulder bolts 48 or the like that have a ground head and that can be moved lateral to the stabilizer bars by turning them in threaded apertures 50 of the support blocks.

Stabilizer bars 12 are now aligned with inner sides 39 of support blocks 38. Force applying bars 26 include a first, wedge shaped end 52 for connection to a force applying mechanism (not shown) and an opposite, straight end 54 having a centered locating groove 56. Pointed locator 44 and shoulder bolts 48 are adjusted so that longitudinal grooves 28 of the force applying bars 26 are aligned with protruding specimen portion 14 between stabilizer bars 12. Upon application of foil strips 32 and strip adhesive 30 over the protruding specimen portion the force applying bar is simply placed in the jig as located by locator 44 and bolts 48 and thereafter forced or pressed against the stabilizer bars for firm connection to the protruding specimen portion. After the first protruding portion has been so connected to a force applying bar test fixture 9 is removed from assembly jig 34, inverted and the second force applying bar is secured to the other protruding specimen portion 14 in the above outlined manner.

The force applying bars 26 are maintained parallel to each other by set screws (not separately shown) located at the ends of the force applying bars. The combined test apparatus, stabilizer and specimen is then removed from the assembly jig and placed in an oven and the adhesive is exposed to a cure cycle.

One of the force applying bars 26, say the upper bar illustrated in FIG. 1, includes a laterally extending mounting plate 58 which extends sideways past outermost side 60 of stabilizer bars 12 and which mounts means such as a micrometer 62 or a suitable transducer (not shown) connected to suitable recording equipment. The micrometer or transducer includes a sensing member 62 in engagement with a laterally and upwardly (as illustrated in FIG. 1) extending post 66 secured to or integrally constructed with the lower (as illustrated in FIG. 1) force applying bar 26. Relative movements between the bar in a longitudinal direction, that is, parallel to long sheet edges 8, is thus sensed by micrometer 62 or the transducer (not shown).

The shear strength and modulus of specimen 6 is determined by placing the fixture between two rams (not shown) which engage wedge shaped ends 52 of force applying bars 26. Upon actuation of the rams to move them together the force exerted by them is recorded on a chart or the like and simultaneously therewith the relative movement of the force applying bars as a result of deflection or deformation of specimen 6 is recorded on micrometer 62. The recordation is preferably continuously charted and the force applied by the rams to bars 26 is increased until specimen 6 fails in shear. With the recorded force and deflection values the yield stress, ultimate stress and the shear modulus of the material of specimen 6 is conventionally determined.

We claim:

1. A method for testing the shear strength of thin foils and the like comprising the steps of providing a rectangularly shaped specimen, applying opposing forces to long edges of the specimen in the direction of the edges, and supporting the major portion of the specimen between the long edges to prevent the buckling of the specimen under the forces before the specimen is stressed in shear to its ultimate strength.

2. A method for testing thin sheets, films, webs and the like in shear comprising the steps: providing an elongate sample web movably supporting sides of the web intermediate relatively long edges thereof so that relatively narrow portions of the sheet extending parallel to the long edges remain unsupported, grasping the narrow portions, applying opposing forces acting parallel to the long edges to the narrow portions, and measuring the applied forces and relative deformation of the webs under the forces for determining the shear strength.

3. A method according to claim 2 wherein the step of grasping comprises the steps of bonding the narrow portions to substantially rigid, elongate bars.

4. A method according to claim 2 wherein the step of supporting comprises the steps of placing the web between flat, opposing members and biasing the members towards each other.

5. A method for testing thin web, foil and the like specimens in shear comprising the steps of applying oppositely acting forces to opposing edges of the web, movably supporting at least a major portion of the web between the opposing edges to prevent buckling of the web under forces insufficient to stress the web to its ultimate strength, and measuring the applied forces and the relative deformation of the web in response to such forces.

6. A method according to claim 5 wherein the web has a rectangular shape and wherein the opposing sides define the long sides of the rectangle.

7. Apparatus for subjecting thin sheets, film, foils and the like to a shear stress up to the ultimate shear stress of the material of the web without buckling the web, the apparatus comprising: a pair of substantially rigid bars having flat sides for placement against the web, means for biasing the bars against the web, the bars having a width slightly less than the width of the web so that narrow web edges protrude past the bars, and means for firmly grasping the narrow edges of the web, the grasping means including force applying members connectable to the web edges and having axes extending substantially parallel to the web edges for substantially evenly applying shear stress generating forces over substantially the full length of the narrow web edges.

8. Apparatus according to claim 7 wherein the bars are constructed of a high strength metal, and further including low friction means between the sides of the bars and the web for reducing frictional forces between the bars of the web and facilitating the relative movement of the web between the bars.

9. Apparatus according to claim 7 wherein the force applying means comprises relatively rigid, elongate members extending over the length of the exposed web edges, and means firmly securing the bars to the web edges for application of the forces.

10. Apparatus according to claim 9 wherein the securing means comprises an adhesive.

11. Apparatus according to claim 10 wherein the elongate members include a longitudinal groove disposed about the exposed edges of the sheet and wherein the adhesive is disposed between the protruding web portion and the longitudinal groove.

12. Apparatus according to claim 11 including means preventing adherence of the adhesive to the bars.

13. Apparatus according to claim 9 including means connected to the elongate members for measuring relative movements between the elongate members when the forces are applied to thus determine the relative deformation of the web.

14. Apparatus according to claim 7 including spring means for yieldingly biasing the bars towards each other, and means for adjusting the biasing force exerted by the spring means.

15. Apparatus for testing elongate, thin webs and the like in shear comprising: means defining opposing, parallel flat faces movable towards each other for supporting a major portion of the webs therebetween and permitting a narrow section of the web substantially parallel to long edges thereof to protrude past the faces, the faces including a low friction coating to facilitate relative movements of the web with respect to the faces, first and second force applying bars including elongate grooves for placement over the protruding web sections, the grooves having a greater width than the thickness of the web, an adhesive disposed about the protruding web sections and firmly interconnecting the sections with the corresponding elongate bars, and means separating the adhesive and the face defining means, whereby the application of opposing forces to the elongate members in the direction of the long edges and the recordation of the force magnitude and relative web deflection enables the determination of the shear strength and shear modulus of the web up to the ultimate shear strength of the web without buckling of the sheet.

16. Apparatus according to claim 15 including fixture means for positioning the face defining means, the fixture means further including means for centering the slot defined by the elongate members with respect to the protruding web sections to facilitate the assemblage of the apparatus.

* * * * *